United States Patent

[11] 3,627,856

| [72] | Inventor | Marc O. Thienot |
| | | Park Forest, Ill. |
| [21] | Appl. No. | 877,444 |
| [22] | Filed | Nov. 17, 1969 |
| [45] | Patented | Dec. 14, 1971 |
| [73] | Assignee | Atlantic Richfield Company |
| | | New York, N.Y. |

[54] RUBBER COMPOSITIONS CONTAINING A POLYHYDROXY DIENE POLYMER
13 Claims, No Drawings

[52] U.S. Cl........................................ 260/889,
260/23.7 N, 260/23.7 M, 260/33.6 AQ, 260/41.5 R, 260/79.5 B
[51] Int. Cl........................................ C08f 41/12, C08d 9/08
[50] Field of Search............................ 260/889, 33.4 PQ, 94.7 OX

[56] References Cited
UNITED STATES PATENTS

| 3,402,140 | 9/1968 | Bickel et al................... | 260/38 |
| 3,392,118 | 7/1968 | Isaacson et al................ | 252/51.5 |

*Primary Examiner*—Murray Tillman
*Assistant Examiner*—C. J. Seccuro
*Attorneys*—Eugene L. Bernard, Martin J. Brown, W. Brown Morton, Jr., John T. Roberts, Malcolm L. Sutherland, John W. Behringer, James N. Dresser and Morton, Bernard, Brown, Roberts and Sutherland

ABSTRACT: Sheeted rubber compositions of ethylene-propylene polymers having improved tack and easier processing and faster dispersion of compounding ingredients are obtained by forming a blend of the ethylene-propylene polymer and from about 1 to 50 percent by weight of a polyhydroxy 1,3-diene polymer, particularly a polyhydroxy acrylonitrile-butadiene polymer, having primary, terminal allylic hydroxyl groups and the majority of its unsaturation in the main carbon chain. Further improvement in tack is obtained by pressure treatment of these rubber sheetings against a "Mylar" or "Teflon" sheet. Sufficient tack is obtained so that the unsupported rubber sheetings will readily stick together during fabrication of rubber articles, such as tires. The compounded blend can be covulcanized to produce elastomers of good mechanical properties.

RUBBER COMPOSITIONS CONTAINING A POLYHYDROXY DIENE POLYMER

This invention relates to ethylene-propylene polymer rubber. More particularly this invention relates to a modified ethylene-propylene rubber stock of improved tack strength and processing characteristics.

One of the major shortcomings of commercially available ethylene-propylene terpolymer rubbers is their inherent lack of tack. Tack is a property of rubber which enables two fresh rubber surfaces to adhere or coalesce. For example, although the surfaces of rubbers may not appear tacky or adhere to foreign surfaces, the rubber surfaces adhere well to each other if the rubber possesses sufficient tack. Tack is very important from the practical standpoint, e.g., for producing rubber goods such as tires and other rubber articles. During the fabrication of rubber goods the surfaces should readily stick together so they may be rolled into place or molded. For example, plies and tread splices must hold during fabrication. It is also desirable for rubber stocks to adhere well during milling on a rubber mill.

Although the new rubbers based upon ethylene-propylene copolymers and terpolymers exhibit excellent weathering characteristics such as ozone and yet resistance, they have mainly found acceptance as main for general mechanical and automotive articles and high-quality molded and extruded goods. These rubbers are susceptible to high levels of oil extension and consequently can be loaded with high quantities of carbon black. The physical properties of these reinforced oil extended stocks are excellent in comparison to other standard rubbers. They provide vulcanizates having good to excellent tensile strengths with maximum values exceeding 5000 p.s.i., a broad range of hardnesses, good to excellent tear strength, good compression set, good to excellent hot stress-strain properties, and a broad resilience range with a low degree of temperature dependence.

In spite of the excellent weathering characteristics and mechanical properties of EPT (ethylene-propylene terpolymer) rubbers, they have not yet gained widespread use in tire manufacture. The main problems hindering their acceptance into this area are associated with the lack of "building tack" in compounded unvulcanized gumstocks, and the poor processing characteristics of the raw and compounded stocks.

Recently in U.S. Pat. No. 3,427,366, issued Feb. 11, 1969, it has been shown that many properties including tack of hydrocarbon rubber, such as ethylene-propylene rubber, could be improved by incorporating therein, in a partially uncured condition, a urethane elastomer made from a polyhydroxy polymer and a diisocyanate.

It has now been found that ethylene-propylene rubbers show increased tack and processing characteristics when modified solely with the polyhydroxy polymers according to this invention. No urethane is employed and thus no diisocyanate is needed. This is a tremendous advantage as it is not necessary to handle the hazardous and expensive diisocyanates in carrying out this invention. Thus this invention eliminates the diisocyanates and surprisingly obtains improved tack and processing characteristics of ethylene-propylene rubbers modified solely with the polyhydroxy polymer. This is of important commercial significance as lack of tack in commercially available ethylene-propylene terpolymer rubbers can be safely and readily remedied by this invention.

Sheeted rubber compositions of ethylene-propylene polymers having improved tack are obtained according to this invention by blending therein from about 1 to about 50 percent by weight based on the ethylene-propylene polymer rubber stock, of a polyhydroxy polymer having an average of at least 1.8 predominately primary, terminal, allylic hydroxyl groups per molecule and being an addition polymer of 0–75 percent by weight of an alpha-monoolefinically unsaturated monomer of two to 12 carbon atoms and about 25 to 100 percent of a 1,3-diene hydrocarbon of four to about 12 carbon atoms, the polyhydroxy polymer having a viscosity at 30° C. of about 5–20,000 poises, a number average molecular weight of about 400–25,000, and having more than 50 percent of its unsaturation in the main carbon chain. The blend can be uncompounded or compounded, and the compounded blend can be vulcanized. The sheeted rubber compositions may contain as little polyhydroxy butadiene or as little ethylene-propylene polymer as is needed to have a significant effect on the properties of the sheeted rubber composition, say as little as 1 to 10 percent of each rubber. Often, about 2 to 50 percent polyhydroxy polybutadiene preferably about 4 or 5 to 20 or even up to 30 percent may be employed.

Polyhydroxy polymers, particularly polyhydroxy copolymers of acrylonitrile and butadiene, can be used to modify ethylene-propylene terpolymers to impart easier processing and faster dispersion of compounding ingredients into the ethylene-propylene terpolymer at stocks, which are normally difficult to handle. The raw uncompounded ethylene-propylene terpolymer herein designated EPT, modified with the polyhydroxy acrylonitrile-butadiene copolymer, herein designated CN–15, has a greatly increased tack.

Although no two polymers are truly miscible or soluble in each other, when polyhydroxy acrylonitrile-butadiene copolymer, herein designated CN–15, was blended into ethylene-propylene terpolymer at concentrations as high as 20 weight percent, micrographs have shown that there was no phase separation or heterogeneity in such blends, which indicates a high degree of compatibility of the two polymers. Raw blends of the two polymers show increased elasticity and surface gloss, and a smoother "feel" than raw EPT rubber stock.

In industrial rubber compounding, processing and modulus are of paramount importance in the production of rubber goods. Tests showed better characteristics for stocks containing CN–15 diene polyhydroxy copolymer up to the 20 percent level. All stocks processed more easily as the CN–15 diene content was increased. Mill sheets and banks were smoother and showed less tendency for bagging, laciness or crumbling. In addition, compounding ingredients were incorporated more readily with less powdery material falling through the pan.

Greatly increased improvements in tack strengths with both are uncompounded and compounded EPT rubber modified with CN–15 polyhydroxy copolymer are obtained by surface treating these sheeted rubber stocks on either "Mylar," poly(ethylene terephthalate) film, or "Teflon," tetrafluooethylene polymer, sheets. After removal of these "Mylar" or "Teflon" sheets, the unsupported ethylene-propylene terpolymer rubber sheetings have greatly increased tack and will readily stick together during fabrication of rubber articles, such as tires. The polyhydroxy polymer blended with ethylene-propylene terpolymer after compounding with carbon black, oil and vulcanizing ingredients, can be covulcanized to produce elastomers of excellent quality.

The polyhydroxy polymers have an average of at least about 1.8 predominately primary, terminal, allylic hydroxyl groups per molecule and are an addition polymer containing 0 to about 75 percent by weight of the residue of an alpha-monoolefinically unsaturated monomer of two to about 12 carbon atoms and about 25 to 100 percent of the residue of a 1,3-diene of four to about 12 carbon atoms, the polyhydroxy polymer having a viscosity at 30° C. of about 5–20,000 poises, having the majority, i.e., more than 50 percent, of its unsaturation in the main carbon chain, and a number average molecular weight of about 400 to 25,000. The polyhydroxy polymers used in this invention are particular hydroxyl-terminated polymers and copolymers of dienes with other reactive monomers and can be prepared by the hydrogen peroxide-isopropanol mutual solvent process described hereinafter. In addition, suitable derivatives derived therefrom are also applicable provided the alcohol moiety of the polymer with its primary, terminal, allylic structure remains intact. These include partially hydrogenated or halogenated hydroxyl-terminated polybutadiene resins having the majority of its unsaturation in the main carbon chain.

The polyhydroxy polymer has a particular structure and contains allylic hydroxyl groups, which usually are at the ends of the main, that is the longest, hydrocarbon chain of these usually liquid diene polymers. These polyhydroxy polymers differ from the homopolymers and copolymers of butadiene and related dienes which are commercially available as GR-S rubber, etc. The polyhydroxy polymers may, in general, have a viscosity at 3° C., of about 5–20,000 poises, preferably about 15 to 5,000 poises. Often the polyhydroxy polymer, when a homopolymer, is obtained in a viscosity range of about 20 to 300 or up to about 550 poises at 30° C. Preferably, the polyhydroxy polymers have a viscosity of about 35 to 60 or up to about 190 to 260 poises. Thus, the polyhydroxy polymers are liquids or semisolids flowable at least when subjected to moderate pressure, at ambient temperatures or at temperatures up to about 400° F. The allylic hydroxyl-terminated polymers used in the present invention will have molecular weights in the range of about 400 to about 25,000 as determined by cryoscopics, ebullioscopic or osmometric methods. The preferred hydroxyl-containing diene polymers will be in the molecular range of about 900 to 10,000. In contrast, conventional diene polymers such as GR-S rubber are extremely high in molecular weight, e.g., in the range of several hundred thousand.

The hydroxy-terminated diene polymers employed to make the novel compositions of this invention differ from diene polymers known to be telechelic and/or hydroxy-containing in that the majority of unsaturation in the former is in the main hydrocarbon chain and in that the hydroxy components are in predominately terminal positions on the main hydrocarbon chain and are predominantly primary and allylic in configuration. Ordinarily, at least about 1.8, often at least about two, frequently 2.1 to 2.8 and up to about three or more hydroxyl groups are present on the average per polymer molecule. Since these hydroxyl groups are predominately primary, terminal and allylic in structure, with approximately two of the hydroxyl groups being at terminating positions on the main carbon chain, the polymers are highly reactive. The polyhydroxy polymer has the majority of its unsaturation in the main hydrocarbon chain and this appears to provide polymers of improved elasticity characteristics.

The dienes which are employed to make the polyhydroxy polymers include the unsubstituted, 2-substituted or 2,3-disubstituted 1,3-dienes of four up to about 12 carbon atoms. The diene preferably has up to six carbon atoms and the substituents in the 2- and/or 3-position may be hydrogen, alkyl, generally lower alkyl, e.g. of one to four carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, 2-phenyl-1,3-butadiene, 2-methyl-3-phenyl-1,3-butadiene, etc. The choice of diene will usually depend upon properties desired in the final elastomer, for example, chloroprene may be used, alone or in admixture with other dienes to produce oil-resistant and flameproof rubbers.

Although polymers of the above described type, averaging more than one predominately primary hydroxyl per molecule, say about 1.8 to three or more per molecule, may be employed in this invention, they preferably have an average of at least two or about 2.1 to 2.4 up to 2.8 hydroxyl groups per molecule and the hydroxyl groups are predominately in terminal, allylic positions on the main, generally longest, hydrocarbon chain of the molecule. By "allylic" configuration is meant the alpha-allylic grouping of allylic alcohol, that is the terminal hydroxyls of the polymer are attached to a carbon adjacent to a double-bond carbon. Preferably, the polymer is substantially free of other hydroxyl groups in order to avoid indiscriminate, premature or excessive cross-linking.

The ratio of cis-1,4 and trans-1,4 and 1,2-vinyl unsaturation which occurs in the diene polymers used in the present invention, the number and location of the hydroxyl groups and the molecular weight of the polyhydroxy polymers can be a function of polymerization temperature and the type of addition polymerization system employed in forming the polymer. It has been found that diene polymers of the desired configuration can be obtained using hydrogen peroxide as the catalyst for polymerization in a mutual alcohol solvent system. This free-radical addition polymerization usually takes place in solution at a temperature of about 30° to 200° C., preferably about 100°–150° C.

The reaction preferably takes place in a mutual solvent system; that is, one which dissolves both the diene monomer and the hydrogen peroxide. Suitable solvents are isopropanol, methanol, sec-butanol, n-butanol, n-propanol and like saturated alcohols, preferably alkanols having two to about 12 carbon atoms. The $H_2O_2$-solvent solvent system is found to supply hydroxyl groups and the catalytic and solvent effects needed to produce the polyhydroxy diene polymers of desired chemical and physical characteristics. In such a polymerization system, the alcohol serves as a solvent for the peroxide and as a solvent or diluent for the diene monomer and is used in an amount suitable to promote adequately rapid but controllable polymerization of the monomer material in the solution to form the diene polymers. The alcohol will be free of any group which would interfere with the production of the desired diene polymer. Saturated alcohols are preferred and often those having about the same carbon atom content as the diene monomer will be found most useful. Thus, propanol or isopropanol is often used in butadiene polymerization. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1 percent to 15 percent of the reaction mixture to assure a low molecular weight addition polymer product having more than two hydroxyl groups per molecule.

The usable intermediate polyhydroxy polymers of butadiene will have the majority of their unsaturation in the main carbon chain and will conform to the following simplified chemical structure:

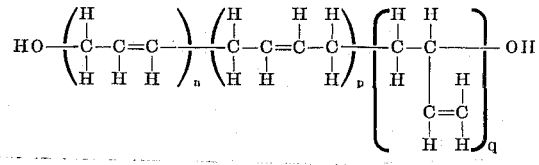

in which $n$ plus $p$ is greater than $q$, that is, the in-chain unsaturation accounts for more than 50 percent of the unsaturation. One or more of the hydrogens appearing in the above formula may be replaced by hydroxyl in some of the molecules. This formula should not be understood as implying that the polymers are necessarily in blocks, but the cis-1,4-, trans-1,4- and vinyl (1,2) unsaturation are usually distributed throughout the polymer molecule. Generally $n$ will be a number sufficient to give a cis-1,4-unsaturation content of about 10–30 percent; $p$ will be a number sufficient to give a trans-1,4 unsaturation content to the polymer in the range of about 40–70 percent while $q$ will be sufficient to give a pendant 1,2-vinyl unsaturation of about 10–35 percent. Often the polymer will contain largely trans-1,4-units, e.g., about 50–65 percent and about 15–25 percent cis-1,4units, with about 15–25 percent 1,2-units. Branching may also occur in the above polymers, especially those prepared at higher temperatures. These hydroxyl terminated polybutadiene resins are usually low molecular weight liquid polymers composed mainly of butadiene units in their backbone structure.

Olefinically-unsaturated monomers may be incorporated into the diene polymer products used in this invention and these may often be components which provide cross-linking sites. Usable monomers include alpha-monoolefinically unsaturated materials of about two or three to 10 or about 12 carbon atoms, such as styrene, vinyl toluene, methyl methacrylate, methylacrylate, acrylic esters, vinyl chloride, vinylidene chloride, etc. Acrylonitrile, acrylic acid, vinylidene cyanide, acrylamide, etc., provide low-molecular weight hydroxy-terminated diene copolymers which have sites suitable for cross-linking. As can be seen, the usable olefinic monomers may be ethylenes, substituted with halogen, aromatic hydrocarbon, or even cyano or carboxyl-containing radicals in some instances. The choice and amount of monoolefinic monomer employed will often be determined on the basis of properties desired in the final elastomer resin. For example, solvent-resistant rubbers may be formulated by copolymerization of butadiene with acrylonitrile, or other monoolefin, substituted with a nonhydrocarbon radical, to produce the polyhydroxy polymer. Generally the amount of monoolefin monomer in the polymer will be 0 to about 75 percent by weight of the total addition polymer, preferably about 1 to 40 percent or even about 10–40 percent, and the balance can be essentially the 1,3 diene.

In addition to the homopolymers and copolymers comprised of single dienes and single monoolefinic or vinyl monomers, the present invention may also use polymers made from combinations of a plurality of dienes and monoolefinic monomers. For example, mixtures of butadiene, isoprene and styrene can be polymerized to afford low molecular weight interpolymers. Various combinations of dienes and monoolefinic monomers may be copolymerized to produce hydroxyl-containing copolymers or interpolymers which may be used to modify the elastomers in this invention. Also, the polymer materials used in this invention may be given improved oxidation and ozone resistance by hydrogenating the hydroxyl-containing diene polymers to their corresponding more-saturated derivatives. Usually, the hydroxyl-containing diene polymers used in the present invention will at most be only partially hydrogenerated, so as to provide a material which is more stable due to diminished unsaturation but which still has good elastomer properties.

Important characteristics of these polyhydroxy butadienes is the presence of hydroxyl end groups on both ends of the polymer chain, extremely narrow molecular weight of essentially uniform distribution and complete lack of crystallizability. This latter property allows cured compositions of these polyhydroxy butadiene polymers to remain rubbery down to very low temperatures.

The uniformity in molecular weight, together with the chemical reactivity of the double bonds, permits the building up of networks of great regularity by vulcanization through the olefin bonds. Since these low molecular weight polyhydroxy butadienes contain one double bond per structural unit, there is the double advantage of cross-linking and grafting between the low molecule weight polyhydroxy butadiene structural units and backbone segments of the high molecular weight ethylene-propylene polymer rubbers.

Copolymers of ethylene and propylene generally display elastomeric properties over a wide range of compositions, roughly 25–75 percent of each component, and have the properties of unvulcanized elastomers when the molecular weight is sufficiently high. These materials are generally soluble in hydrocarbon solvents at room temperature, have a relatively low modulus of elasticity, high resilience and considerable creep under prolonged stress. Such polymers may be prepared with a susceptibility for vulcanization or other cross-linking by including small amounts of alpha-olefins or other copolymerization materials which retain a reactive group after the polymerization. These terpolymers are known commercially as EPT or EPDT as they are terpolymers of ethylene, propylene and diene hydrocarbons of five to about 12 carbon atoms. Diolefins such as dicyclopentadiene, 1-5-cyclooctadiene, 2-methyl-1,4-pentadiene, 1-4-hexadiene, 1-4-cycloheptadiene, 5-methylene-2-norbornene, 5-buten-2-YL-2-norbornene, 5-ethylidene-2-norbornene, 1-4-9-decatriene, etc., are often the preferred nonconjugated dienes in such situations. The vulcanized E-P terpolymers show good resistance to aging and have greater tensile strength than natural rubber or GR-S polymers. Many E-P polymers contain about 35 to 80 mole percent ethylene, about 15 to 60 mole percent propylene and in the terpolymers about 1 to 5 mole percent diene. Preferably, the amounts are about 50 to 67 mole percent ethylene and about 23 to 50 mole percent propylene, based on their total. Ethylene-propylene polymers, copolymers and terpolymers, can be prepared by ionic-polymerization techniques. Such catalysts as the Ziegler type may be employed. Ziegler-type catalysts are usually mixtures of transition metal chlorides, such as $VCl_4$, or $VO(OR)_{3-n}X_n$ or similar compounds with trialkyl aluminum compounds or $R_2AlX$ where $n$ is 1 or 2, X is halogen, i.e. chlorine, bromine or iodine and R is lower alkyl such methyl, ethyl, propyl or butyl. Generally such polymerization reactions are carried out under "low-pressure" operating conditions.

The polyhydroxy butadiene polymers are miscible in all proportions in ethylene-propylene polymers by mastication in an internal mixer or on an open roll mill. The compositions of this invention may contain as little polyhydroxy polymer as is needed to have a significant effect on the ethylene-propylene polymer, that is to improve the tack and processing characteristics. Thus amounts of polyhydroxy polymer may be used from about 1 to 50 percent by weight based on the ethylene-propylene polymer, copolymer or terpolymer. Often about 5 to 30 percent and preferably about 3 to 10 up to 20 percent by weight of polyhydroxyl polymer may to used.

Along with the polyhydroxy polymer and the ethylene-propylene rubber, the novel compositions of this invention may contain bulk extenders such as extender mineral oils (including asphalt and similar heavy hydrocarbons), strengtheners, such as carbon black, and pigments, fillers, etc., as commonly used with general purpose rubbers. Ordinarily these ingredients may form a considerable proportion of the final product, being as little, for example, as 1 percent or less of the total rubber ingredients up to 10 times or more of such ingredients. Extender oil and carbon black components equaling the weight of the rubber is not unusual. The extender oils, carbon black, etc., may be incorporated into the rubber before the polyhydroxy polymer is added to the mixer or mill; alternatively, after incorporation of the polyhydroxy polymer into the ethylene-propylene rubber. The resulting product is further blended with sulfur, zinc oxide, stearic acid, inert or reinforcing filler, extender oils and resins, etc., and the final mixture cured at elevated temperatures of say about 200°–400° F., preferably about 275°–325° F. Peroxide cures may also be effected at about the same temperature ranges. However, the ethylene-propylene terpolymers blended with polyhydroxy butadiene polymers show improved tack properties prior to carrying out the final sulfur vulcanization and thus manufacture is greatly facilitated. No bloom occurs in these blends.

The following examples are illustrative of various embodiments of this invention and include preferred embodiments thereof.

EXAMPLE A

Hydroxyl-terminated polybutadiene polymers and copolymers are described as being exemplary of those which can be used in the present invention.

A polyhydroxy acrylonitrile-butadiene copolymer, herein designated CN-15, is prepared having a viscosity of 493 poises at 30° C., a hydroxyl content of 0.57 meq./g. an average molecular weight of 4400, and about 2.5 terminal, allylic hydroxyl groups, which are predominantly primary per polymer molecule. This type of copolymer can be made by copolymerizing acrylonitrile with butadiene in isopropanol solvent and in the presence of hydrogen peroxide using the following ratio of reactants: 85 parts butadiene, 15 parts acrylonitrile, 70 parts isopropanol, 12 parts hydrogen peroxide (50 percent). The reactants are heated in an autoclave at 115° C. for 2 hours and stripped.

A polyhydroxy styrene-butadiene copolymer is prepared having a molecular weight of about 3700, a viscosity at 30° C. of 220 poises, a hydroxyl content (meq./g.) of 0.68, and about 2.5 terminal, allylic, hydroxyl groups which are predominantly primary per polymer molecule. This type of copolymer can be made by polymerizing 75 parts butadiene and 25 parts styrene in the presence of 70 parts isopropanol and 10 parts of 50 percent hydrogen peroxide for 2 hours 20 minutes at 120° C.

A polyhydroxybutadiene homopolymer is prepared having a viscosity of 50 poises at 30° C., a hydroxyl content of 0.82 meq./g., an average molecular weight of about 2800, and about 2.3 terminal allylic, hydroxyl groups which are predominantly primary per polymer molecule. This type of homopolymer can be prepared by polymerizing 390 parts of butadiene in the presence of 240 parts of isopropanol and 39 parts of 30 percent hydrogen peroxide in 33 parts of water at 118° C. for 2 hours 20 minutes.

A polyhydroxybutadiene homopolymer is prepared having a viscosity at 30° C. of 223 poises, a hydroxyl content of 0.68 meq./g., an average molecular weight of about 3800, and about 2.6 terminal, allylic hydroxyl groups which are predominantly primary per polymer molecule. This type of polymer can be prepared by polymerizing 100 parts of butadiene in the presence of 35 parts of isopropanol and 6 parts of 50 percent hydrogen peroxide for 3 hours at 130° C.

EXAMPLE I

A commercial ethylene-propylene terpolymer rubber (Nordel 1070), herein designated EPT or EPT Nordel 1070, was employed as the ethylene-propylene terpolymer rubber stock in these tests. There was also employed in these tests as the tackifier of this invention, acrylonitrile-butadiene copolymer, herein designated CN-15, prepared in accordance with the general procedure of example A.

The acrylonitrile-butadiene copolymer was incorporated into the raw ethylene-propylene terpolymer to give an uncompounded blend of 5 parts by weight of CN-15 per hundred parts of the EPT. The raw EPT was masticated for about 30 seconds in a slow speed, 3-4 lb. capacity, Struther Wells internal mixer at room temperature. The acrylonitrile-butadiene copolymer CN-15 was added and the mix allowed to blend to produce an uncompounded CN-15 modified EPT stock.

The batches were dumped from the internal mixer at about 50° C. and immediately sheeted on a cold 8-inch open rubber mill into one-eighth to three-sixteenths inch thick slabs. These were allowed to stand in closed containers at room temperature for 24 hours to allow the gum to relax.

For each tack test, two rectangular strips of different sizes were cut out with a razor blade. One of the two specimens was cut to accurate size (exactly 1 inch by 7 inches) while the other specimen was cut to a slightly larger size (about 2 inches by 7 inches).

Pieces of relatively inextensible cloth backing served like tire cords in a carcass ply to prevent stretching of the specimens during the peel strength test. The backing was applied under pressure on only one side of the rubber strips forming a ply.

The rubber specimens of different sizes, exact size (1 inch by 7 inches) and slightly larger size (about 2 inches by 7 inches) were laid rubber surface to rubber surface and carefully matched onto the other in such a way as to avoid trapping of air between the two rubber surfaces and pressed together. Specimens were plied between two platens under 60 pounds pressure at 85° F. for 6 seconds using a "Sentinel Heat Sealer" pressing device equipped with 1-inch by 12-inch platens.

A piece of film was inserted at either end of the sample between the rubber sheets keeping the ends of the rubber sheets separated during plying operation, thus providing ends of the rubber sheets for attachment to the clamps of the tester. The samples were removed from the pressing device and let stand to equilibrate and cold flow at room temperature on a flat surface for 15 minutes before measuring the relative tensile tack strength.

Specimens were tested in tension on an Instron tester at a jaw separation rate of 2 inches per minute. Tackiness was determined by measuring the force required to separate plies of samples prepared as herein described. Relative tack strength was expressed in grams load/inch width of the original cross section.

Additional rubber specimens were given a surface treatment by being sandwiched between the cloth backing and a surface substrate, a "Mylar" polyester film being used with some of the specimens and a "Teflon" polytetrafluoroethylene sheet being used with other of the specimens.

The other side of the ply from the cloth backing was covered with a "Teflon" polytetrafluoroethylene sheet or a "Mylar" polyester film, the sheet thus protecting the specimen during contact with the press platen, allowing the formation of a smooth "treated" surface and easy peel-off from the rubber specimen.

The samples being mounted were pressed between two polished metal platens in a Farrel Watson Stillman press for 1 minute at room temperature under 5 tons plying pressure. The strips were then removed from the press and allowed to stand overnight on a smooth tray laying on the "Teflon" sheet or "Mylar" film side. The "Teflon" sheet or "Mylar" film was then removed from the rubber layers, and the rubber specimens of the two different sizes were laid rubber surface to rubber surface and subjected to 60 pounds pressure at 85° F. for 6 seconds using a pressing device equipped with 1-inch by 12-inch platens and allowed to equilibrate at room temperature for 15 minutes before testing as heretofore described with respect to the non-surface-treated rubber specimens.

The results of the tack strength tests on uncompounded EPT rubber modified with 5 parts per hundred of acrylonitrilebutadiene polyhydroxy copolymer CN-15 are shown in table I, Rubber Stock No. 2. There are shown for comparison in table I, tack strength tests on Rubber Stock No. 3 which is an uncompounded EPT modified with 5 parts per hundred of Neoprene FB, a recommended tackifier and process aid for EPT. Rubber Stock No. 1 is a straight EPT stock with no modifier. There are also shown comparative tack strength tests on natural rubber, Rubber Stock No. 4, on styrene-butadiene (SBR), Rubber Stock No. 5, Butyl Bucar, Rubber Stock No. 6, and cis-1,4-polybutadiene, Rubber Stock No. 7. All specimens were prepared for testing in accordance with the same procedure as herein set forth.

The tack strength tests in table I show that incorporation of 5 parts per hundred of CN-15 in raw uncompounded EPT greatly increased the tack strength for both nonsurface-treated and surface-treated stocks and that these increases were comparable to the increases obtained with Neoprene FB. The tack strength of EPT modified with CN-15, although not as good as natural or Butyl Bucar rubber, was better than styrene-butadiene rubber and was comparable to cis-1,4-polybutadiene rubber.

In all the uncompounded stocks tested in table I, surface treated stocks showed substantial improvements in tack strengths over the nonsurface-treated stocks.

TABLE I.—Tack Strengths of Uncompounded Rubber Stocks

| Rubber stock number | 1 | 2 | 3 | 4 | 5 | 6 | 7 |
|---|---|---|---|---|---|---|---|
| EPT Nordel 1070 | 100 | 100 | 100 | | | | |
| Natural rubber SMR-5 | | | | 100 | | | |
| SBR 1500C | | | | | 100 | | |
| Butyl Bucar 5000S | | | | | | 100 | |
| CN-15 | | 5 | | | | | |
| Neoprene FB | | | 5 | | | | |
| Cis-1-4-polybutadiene No. 1203 | | | | | | | 100 |
| Tack Strength, g.: | | | | | | | |
| No surface treatment | 475 | 800 | 800 | 1,360 | 225 | 1,644 | 907 |
| Mylar film treatment | 680 | 1,125 | 1,450 | 2,267 | 1,050 | 3,628 | 1,587 |
| Teflon sheet treatment | 900 | 1,550 | 1,300 | 2,607 | 350 | 2,721 | 1,133 |

EXAMPLE II

Ethylene-propylene terpolymer modified with 5 parts per hundred of CN-15 was compounded in the internal mixer using an alternating mixing technique. Zinc oxide, stearic acid and half of the total carbon black (EPC Spheron No. 9) was added to the modified EPT. Then half of the total extending oil (Circosol 42×H) was added. The procedure was repeated for the remaining carbon black and oil. The total mixing cycle was 15 minutes. Addition of sulfur and accelerators was done on 8-inch open rubber mill using standard procedures. Specimens were prepared for tack strength testing according to the procedure of example I.

The presence of CN-15 in EPT rubber was found to be very beneficial with respect to carbon black incorporation time during mill mixing operations. EPT rubber by itself tends to be relatively baggy and difficult to handle while adding carbon black, but addition of 5 parts per hundred of CN-15 smoothed out the stock and accelerated the rate of carbon black incorporation. It reduced the nerve of the gumstock to a point where the other ingredients could be added without difficulty. It also provided a good "hand" or "feel" to the black masterbatch.

Table II gives test results of tack measurements on compounded unvulcanized EPT stocks. Compounded Stocks No. 1 and No. 2 are the control EPT stocks. Compounded Stock No. 3 is EPT stock modified with 5 parts per hundred of CN— according to this invention. Compounded Stock No. 4 is EPT stock modified with 5 parts per hundred of Neoprene FB for comparison. The compounding ingredients are also shown in table II wherein TMTMS is tetramethylthiuram monosulfide, MBT is mercaptobenzothiazole and Zn DMDTC is zinc dimethyldithiocarbamate.

While with nonsurface-treated stocks, the EPT modified with Neoprene FB had the highest tack, with surface-treated stocks EPT modified with CN-15 according to this invention was greatly superior in tack strength to either the Neoprene modified EPT or the control EPT stocks.

TABLE II

Formulation and Tack Properties of Compounded EPTs

| Compounded Stock Formulation | No. 1 | No. 2 | No. 3 | No. 4 |
|---|---|---|---|---|
| EPT Nordel 1070 | 100 | 105 | 100 | 100 |
| Neoprene FB |  |  |  | 5.0 |
| CN-15 |  |  | 5.0 |  |
| EPC Spheron 9 | 80 | 80 | 80 | 80 |
| Circosol 42 × H | 40 | 40 | 40 | 40 |
| ZnO | 5.0 | 5.0 | 5.0 | 5.0 |
| Stearic Acid | 1.0 | 1.0 | 1.0 | 1.0 |
| TMTMS | 1.5 |  |  |  |
| MBT | 0.5 | 0.55 | 0.55 | 0.55 |
| Zn DMDTC |  | 2.75 | 2.75 | 2.75 |
| S | 1.5 | 4.40 | 4.40 | 4.40 |
| Tack Strength g. |  |  |  |  |
| No Surface Treatment | 1133 | 861 | 950 | 1500 |
| Mylar Film Treatment | 4082 | 2721 | 6259 | 3401 |
| Teflon Sheet Treatment | 3628 | 3175 | 4808 | 3628 |

NOTE: EPC Spheron 9 is a commercial carbon black.
Circosol 42×H is a commercial plasticizing oil.
TMTMS is tetramethylthiuram monosulfide, a super accelerator.
MBT is mercaptobenzothiazole. (accelerator)
Zn DMDTC is zinc dimethyldithiocarbamate, a super accelerator.

EXAMPLE III

The compounded gum rubber stocks as shown in table II were vulcanized according to ASTM Method D-15-64-T. Square sheets were cut from the slab stock at least 3 mm. (one-eighth inch) wider than the corresponding dimensions of the mold cavity and cured under 20 tons p.s.i. pressure in an electrically heated vulcanizing press maintained at the temperature and time shown in table III. The aluminum molds had cavity sections which gave sheets approximately 125 by 125 by 3 millimeters. At the end of the curing cycle, the molds containing the vulcanizates were immediately cooled in cold water and the vulcanizates dried and kept in a dark storage area at room temperature. After allowing the vulcanizates to stand for 24 hours, the various physical properties were measured on an Instron tensile tester according to ASTM D-624-54. The physical properties of the cured vulcanizates are shown in table III.

Tear strength of CN-15 modified EPT, compounded stock No. 3, was increased over both neoprene modified EPT, compounded stock No. 4, and the control EPT using the same sulfur accelerator system, compounded stock No. 2. Three hundred percent modulus determinations were comparable with a slight increase for the CN-15 modified stock. Tensile and elongations of the CN-15, and neoprene modified stocks were comparable but lower than the control EPT. Vulcanization properties of compounded stock No. 1, an unmodified EPT cured with a recommended sulfur-accelerator system are also shown in table III. Tensile and tear properties of compounded stock No. 1 compare well with the CN-15 modified vulcanizates, however, lower 300 percent modulus and higher elongation were obtained.

The vulcanization results show that CN-15 modified EPT stocks can be vulcanized to produce elastomers having excellent mechanical properties.

TABLE III

Mechanical Properties of Vulcanized Elastomers

| Compounded Stock | No. 1 | No. 2 | No. 3 | No. 4 |
|---|---|---|---|---|
| Modifier | — | — | CN-15 | Neoprene FB |
| Vulcanization |  |  |  |  |
| Time, min. | 30 | 20 | 20 | 20 |
| Temperature, °F. | 320 | 320 | 320 | 320 |
| Mechanical Properties |  |  |  |  |
| Tensile Strength, p.s.i. | 4693 | 5687 | 4651 | 4884 |
| % Elongation | 670 | 600 | 520 | 540 |
| 300% Modulus p.s.i. | 1017 | 1803 | 2054 | 1917 |
| Tear Strength l.p.i. | 357 | 474 | 472 | 356 |

The embodiments of the invention in which an exclusive property or privilege is claimed are defined as follows:

1. A sheeted rubber composition consisting essentially of a blend of an ethylene-propylene polymer rubber stock and from 1 to 50 percent by weight, based on said rubber stock, of a polyhydroxy polymer having an average of at least about 1.8 predominantly primary, terminal, allylic hydroxyl groups per average molecule and being an addition polymer of 0–75 percent by weight of an alpha-monoolefinically unsaturated monomer of two to 12 carbon atoms and about 25 to 100 percent of a 1,3-diene hydrocarbon of four to about 12 carbon atoms, said polyhydroxy polymer having a viscosity at 30° C. of about 5–20,000 poises, a number average molecular weight of about 400–25,000, and having a more than 50 percent of its unsaturation in the main carbon chain.

2. The sheeted rubber composition of claim 1 wherein said ethylene-propylene polymer is an ethylene-propylene terpolymer rubber stock containing about 25 to 75 percent propylene.

3. The sheeted rubber composition of claim 1 wherein said blend is an uncompounded rubber stock.

4. The sheeted rubber composition of claim 1 wherein said blend is a compounded rubber stock.

5. The sheeted rubber composition of claim 4 wherein said compounded rubber stock is vulcanized.

6 The sheeted rubber composition of claim 1 wherein said 1,3-diene hydrocarbon is butadiene.

7. The sheeted rubber composition of claim 1 wherein said alpha-monoolefinically unsaturated monomer is acrylonitrile and said 1,3-diene hydrocarbon is butadiene.

8. A sheeted rubber composition, consisting essentially of a blend of ethylene-propylene terpolymer rubber stock and from about 1 to 50 percent by weight, based on said rubber stock, of a polyhydroxy polymer having an average of at least about two predominantly primary, terminal, allylic hydroxyl groups per average molecule and being an addition polymeric of 0–75 percent by weight of acrylonitrile and about 25 to 100 percent by weight of a 1,3-diene hydrocarbon of four to about 12 carbon atoms, said polyhydroxy polymer having a viscosity at 30° C. of about 15 to 5000 poises, a number average molecular weight of about 900 to 10,000, and having more than 50 percent of its unsaturation in the main carbon chain.

9. The sheeted rubber composition of claim 8 wherein said 1,3-diene hydrocarbon is butadiene.

10. The sheeted rubber composition of claim 8 wherein said polyhydroxy polymer is an addition polymer of about 15 percent acrylonitrile and about 85 percent of butadiene.

11. The sheeted rubber composition of claim 8 wherein said blend is an uncompounded rubber stock.

12. The sheeted rubber composition of claim 8 wherein said blend is a compounded rubber stock.

13. The sheeted rubber composition of claim 12 wherein said compounded rubber stock is vulcanized.

* * * * *